United States Patent
Yamauchi (10) Patent No.: US 12,119,857 B2
(45) Date of Patent: Oct. 15, 2024

(54) MULTILAYER SUBSTRATE AND WIRELESS MODULE MOUNTED SUBSTRATE

(71) Applicant: LAPIS Semiconductor Co., Ltd., Yokohama (JP)

(72) Inventor: Shigeki Yamauchi, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 692 days.

(21) Appl. No.: 17/207,247

(22) Filed: Mar. 19, 2021

(65) Prior Publication Data

US 2021/0306021 A1   Sep. 30, 2021

(30) Foreign Application Priority Data

Mar. 27, 2020 (JP) ................. 2020-058111

(51) Int. Cl.
*H04B 1/38* (2015.01)
*H01Q 9/42* (2006.01)

(52) U.S. Cl.
CPC ............. *H04B 1/38* (2013.01); *H01Q 9/42* (2013.01)

(58) Field of Classification Search
CPC .......... H04B 1/38; H01Q 9/42; H01Q 13/206; H01Q 1/38
See application file for complete search history.

(56) References Cited

U.S. PATENT DOCUMENTS

2012/0086130 A1* 4/2012 Sasaki ............... H01L 24/92
257/774
2015/0235122 A1* 8/2015 Finn ............... H01F 27/363
235/492

FOREIGN PATENT DOCUMENTS

JP    2011-211491 A    10/2011

* cited by examiner

*Primary Examiner* — Su C Kim
(74) *Attorney, Agent, or Firm* — RABIN & BERDO, P.C.

(57) ABSTRACT

A multilayer substrate includes a first dielectric layer, a first conductive layer, and a conductor portion. The first dielectric layer has a first region. The first conductive layer is laminated on the first dielectric layer, excluding the first region. The conductor portion has one or more auxiliary conductors disposed at a distance from the first conductive layer, and one or more connecting conductors that connect said one or more auxiliary conductors to the first conductive layer.

9 Claims, 8 Drawing Sheets

MULTILAYER SUBSTRATE AND WIRELESS MODULE MOUNTED SUBSTRATE

CROSS REFERENCE TO RELATED APPLICATION

This application is based upon and claims the benefit of priority of the prior Japanese Patent Application No. 2020-058111, filed on Mar. 27, 2020, the entire contents of which are incorporated herein by reference.

TECHNICAL FIELD

The present invention relates to a multilayer substrate having a conductive layer and a dielectric layer laminated therein.

BACKGROUND ART

Currently, various types of wireless communication devices that utilize IoT (Internet of Things) are developed. Also, wireless communication devices are increasingly used in industries that have never used wireless communication devices before.

In order to use the wireless communication function, it is necessary to obtain wireless authentication that conforms to national standards and regulations of each country. In-depth knowledge of wireless communication technology is required to obtain this wireless authentication, which hinders the market expansion.

As a means for solving this problem, wireless modules that come with pre-obtained wireless authentication are widely used. A device equipped with such a wireless module that comes with wireless authentication does not need to separately obtain wireless authentication.

Known examples of this type of wireless module includes a wireless module with a built-in antenna. For example, a wireless module using a built-in planar antenna having a meander shape is proposed (see Japanese Patent Application Laid-open Publication No. 2011-211491, for example).

SUMMARY OF THE INVENTION

Problems to be Solved by the Invention

As described above, wireless authentication is required to use the wireless communication function. For this regulatory reason, it is expected that there will be increase in demand for wireless modules that come with pre-obtained wireless authentication.

However, the antenna characteristics of a small wireless module may be affected by the material and thickness of a substrate on which the wireless module is mounted, the mounting location of the wireless module, and the like. Thus, it may be necessary to adjust the antenna characteristics after the wireless module is mounted on a substrate. If any modifications are made to the wireless module, however, the wireless authentication becomes invalid, which means that it is not possible to adjust the antenna characteristics without compromising the validity of the wireless authentication.

The present invention was made in view of this problem, and is aiming at providing a multilayer substrate that can adjust the antenna characteristics when a wireless module is mounted on the substrate without modifying the wireless module itself.

A multilayer substrate of the present invention includes a first dielectric layer having a first region; a first conductive layer laminated on the first dielectric layer excluding the first region; and a conductor portion having one or more auxiliary conductors disposed at a distance from the first conductive layer, and one or more connecting conductors that connect the one or more auxiliary conductors to the first conductive layer.

A multilayer substrate of the present invention includes: a first dielectric layer having a first region; a first conductive layer laminated on the first dielectric layer excluding the first region; and a conductor portion having one or more auxiliary conductors formed in the first region of the first dielectric layer at a distance from the first conductive layer, wherein the one or more auxiliary conductors each have a first connecting pad, wherein the first conductive layer has a plurality of second connecting pads, and wherein the first connecting pads and the second connecting pads can be connected by connecting lines made of a conductor.

According to the multilayer substrate of the present invention, it is possible to adjust the antenna characteristics when a wireless module is mounted on the substrate without modifying the wireless module itself.

DETAILED DESCRIPTION OF EMBODIMENTS

Preferred embodiments of the present invention will be described in detail below. In the descriptions of respective embodiments below and appended diagrams, the same reference characters are given to parts that are substantially the same as each other or equivalent to each other.

Figure 1:
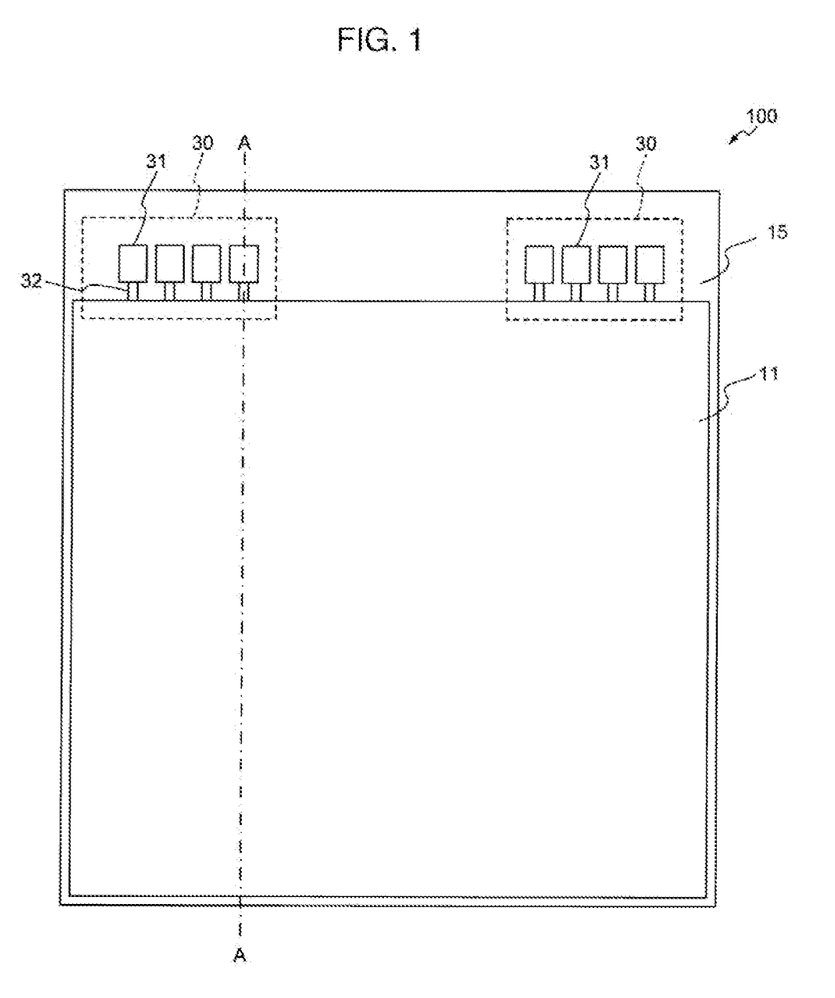
FIG. 1 is a top view illustrating a configuration of a multilayer substrate of Embodiment 1 of the present invention.

FIG. 1 is a top view of one surface (referred to simply as a surface below) of a multilayer substrate 100 of this embodiment. A wireless module is to be mounted on this surface of the multilayer substrate 100. The multilayer substrate 100 also has a conductor portion 30 including a plurality of auxiliary conductors each formed in an island shape.

The multilayer substrate 100 is a layered substrate constituted of a plurality of conductive layers respectively sandwiching a dielectric layer. The multilayer substrate 100 has a rectangular shape in a top view. In the upper part of the layered substrate 100, a PP layer 15 and an L1 layer 11 are laminated. The L1 layer 11 is the first conductive layer. The PP layer 15 is the first dielectric layer located below the L1 layer 11. A resist film made of a solder resist is formed on the surface of the L1 layer 11 and a part of the surface of the PP layer 15, but the resist film is not shown in FIG. 1.

The L1 layer 11 is made of a conductor (such as Cu) formed in a planar pattern, and forms a solid pattern GND. In the description below, the surface of the L1 layer 11 below the resist film will also be referred to as a GND surface.

On the resist film formed on the surface of the L1 layer, a part mounting area is provided to mount the main part of a wireless module 20 and various other parts thereon. The various parts mounted on the part mounting area are connected to a power supply layer and the like in the multilayer substrate 100 through a via.

Figure 2:
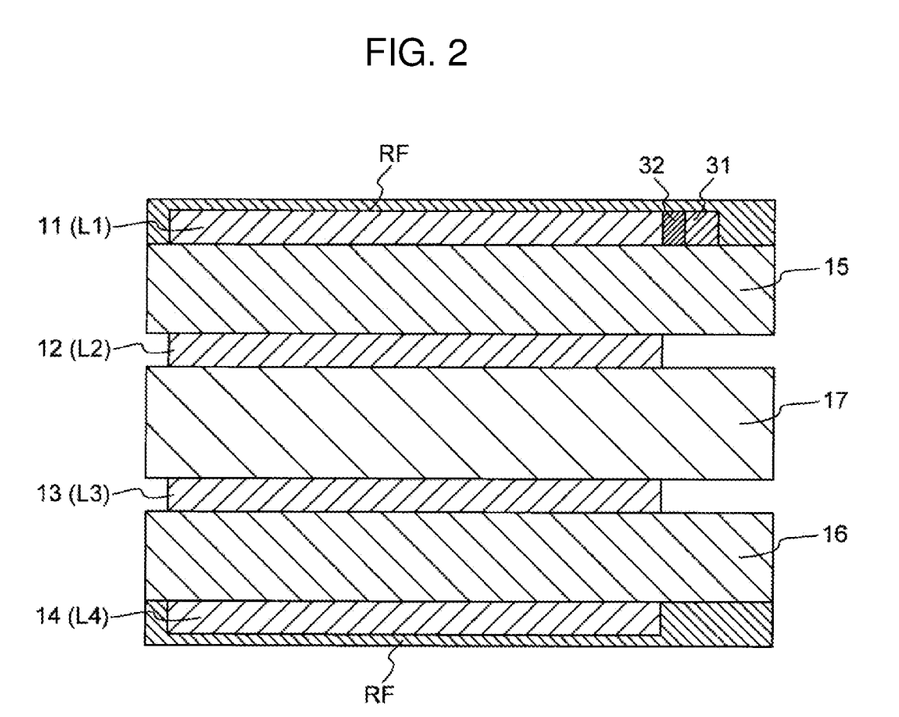
FIG. 2 is a diagram schematically illustrating a layered structure of the multilayer substrate of Embodiment 1 of the present invention.

FIG. 2 is a cross-sectional view schematically illustrating the layered structure of the multilayer substrate 100. This cross section was cut along the line AA in FIG. 1.

The multilayer substrate 100 of this embodiment is a four-layer rigid substrate, for example, and is made up of the L1 layer 11, L2 layer 12, L3 layer 13, L4 layer 14, PP layer 15, PP layer 16, and core layer 17. Furthermore, a resist film RF is formed to cover the outer surfaces of the L1 layer 11 and the L4 layer 14, and part of the surfaces of the PP layer 15 and the PP layer 17 (that is, the surface of the PP layer 15 not overlapping the L1 layer 11, and the surface of the PP layer 17 not overlapping the L4 layer 14).

The L1 layer 11 is a conductive layer in the first layer of the four-layer structure (first conductive layer). The L1 layer 11 is formed as a signal layer (wiring layer) made of a copper foil (Cu), for example.

The L2 layer 12 is a conductive layer in the second layer of the four-layer structure (second conductive layer). The L2 layer 12 is formed as a plain layer made of a copper foil (Cu), for example.

The L3 layer 13 is a conductive layer in the third layer of the four-layer structure (third conductive layer). The L3 layer 13 is formed as a plain layer made of a copper foil (Cu), for example.

The L4 layer 14 is a conductive layer in the fourth layer of the four-layer structure (fourth conductive layer). The L4 layer 14 is formed as a signal layer (wiring layer) made of a copper foil (Cu), for example.

The PP layer 15 is a dielectric layer formed between the L1 layer 11 and the L2 layer 12. The PP layer 15 is formed of pre-preg that is made from epoxy resin or the like.

The PP layer 16 is a dielectric layer formed between the L3 layer 13 and the L4 layer 14. The PP layer 16 is formed of pre-preg that is made from epoxy resin or the like.

The core layer 17 is an intermediate layer located in the center of a layered substrate, and is formed between the L2 layer 12 and the L3 layer 13. The core layer 17 is made of a material obtained by hardening epoxy resin or the like.

Figure 3:
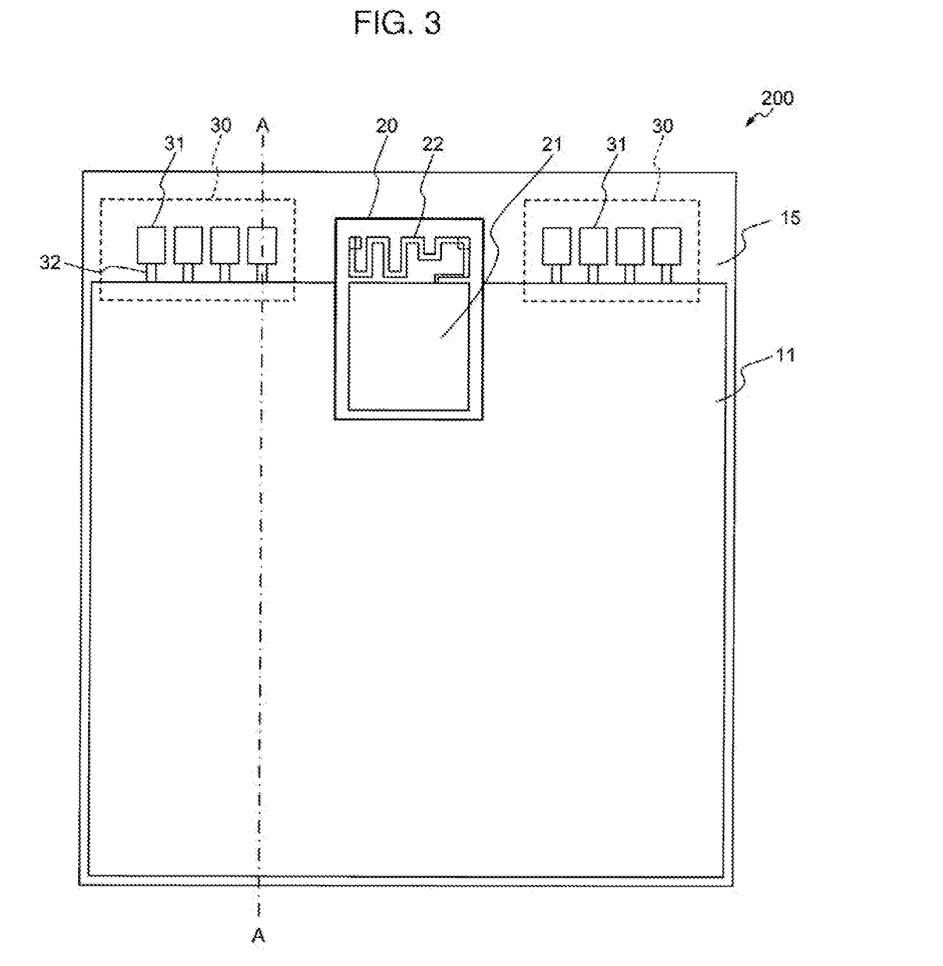
FIG. 3 is a top view illustrating a state where a wireless module is mounted on the multilayer substrate of Embodiment 1 of the present invention.

FIG. 3 is a top view of a wireless module mounted substrate 200, which is the multilayer substrate 100 having the wireless module 20 mounted thereon. The wireless module 20 is constituted of a main body 21 and an antenna 22.

The main body 21 includes a wireless communication circuit that transmits and receives wireless signals. The antenna 22 is made of a band-shaped conductor, and has a meander shape that is a repeated square U-shape.

The wireless module 20 is formed separately from the multilayer substrate 100, and is mounted on the multilayer substrate 100 after going through prescribed processes such as wireless authentication. The wireless module 20 is placed at the border between the surface of the L1 layer 11 and the surface of the PP layer 15 where the L1 layer 11 is not formed (referred to as the first region of the PP layer 15) such that the main body 21 is placed on the L1 layer 11 and the antenna 22 is placed on the PP layer 15 in the first region.

The conductor portion 30 is provided in the first region of the PP layer 15 of the multilayer substrate 100. In this embodiment, two conductor portions 30 are located at the left side and the right side of the area where the antenna 22 is placed when the wireless module 20 is mounted, such that the two conductor portions 30 face each other across the antenna 22.

The conductor portion 30 includes a plurality of auxiliary conductors 31 each formed in an island shape. The auxiliary conductor 31 of this embodiment has a rectangular shape in a top view. Each of the auxiliary conductors 31 is formed in the first region of the PP layer 15 at a distance from the L1 layer 11, and is connected to the L1 layer 11 through a connecting line made of a conductive material (that is, a connecting conductor).

Figure 4A:
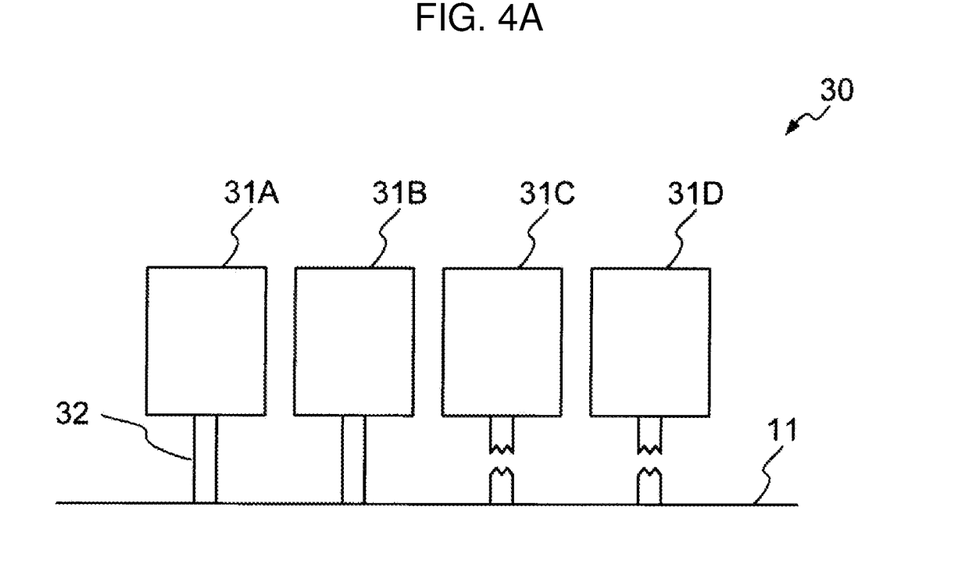
FIG. 4A is a diagram illustrating an example of a connecting part between auxiliary conductors and an L1 layer.

FIG. 4A is a diagram illustrating an example of a connecting part between the auxiliary conductors 31 and the L1 layer 11. The auxiliary conductors 31A, 31B, 31C, and 31D of the conductor portion 30 are respectively connected to connecting conductors 32 made of a zero-ohm resistor, a jumper line, or the like.

Each of the connecting conductors 32 is formed to extend in the direction along which the auxiliary conductor 31 and the L1 layer 11 are separated. The diameter of each of the connecting conductors 32 in the direction intersecting with the extension direction thereof is smaller than the diameter of the auxiliary conductors 31A to 31D, and the connecting conductors 32 are formed such that they can be cut with ease. For example, the connecting conductors 32 are cut by laser radiation or the like after the multilayer substrate 100 is manufactured. By cutting the connecting conductors 32, each of the auxiliary conductors 31A, 31B, 31C, and 31D can be selectively connected to the GND surface of the L1 layer 11.

For example, suppose the multilayer substrate 100 in which all of the auxiliary conductors 31A to 31D are connected to the L1 layer 11 through the connecting conductors 32 is manufactured. In this state, by cutting the connecting conductors 32 between the auxiliary conductors 31C and 31D and the L1 layer 11, only the auxiliary conductors 31A and 31B, among the plurality of auxiliary conductors, will be connected to the GND surface of the L1 layer 11.

Figure 4B:
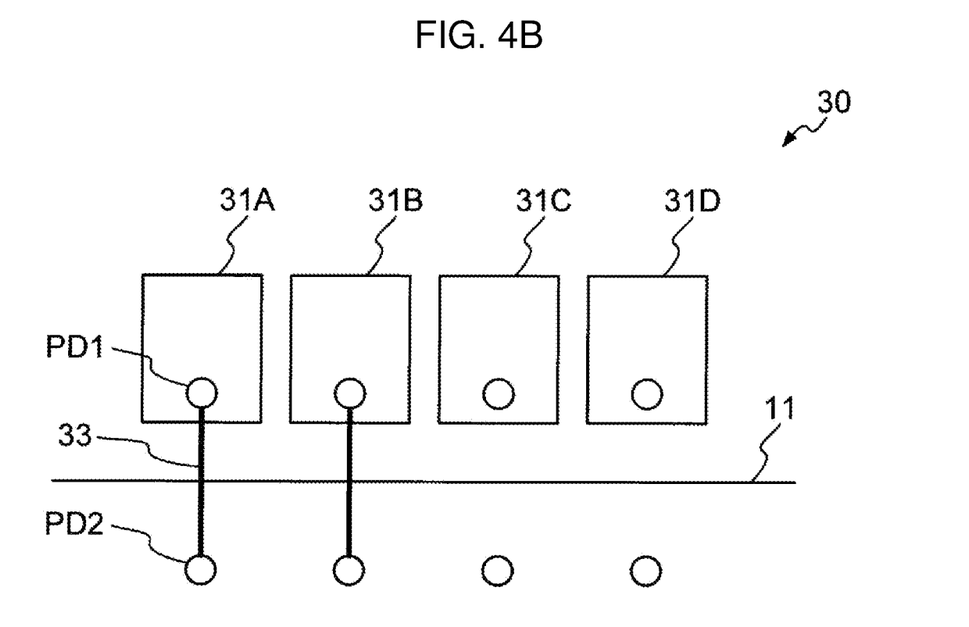
FIG. 4B is a diagram illustrating another example of a connecting part between auxiliary conductors and the L1 layer.

FIG. 4B is a diagram illustrating another example of the connecting part between the auxiliary conductors 31 and the L1 layer 11. Each of the auxiliary conductors 31A, 31B, 31C, and 31D of the conductor portion 30 has a pad PD1 formed therein. On the other hand, the L1 layer 11 has pads PD2 formed therein.

The auxiliary conductors 31 and the L1 layer 11 can be electrically connected with ease by connecting the pads PD1 and PD2 to each other using a connecting line made of a conductive material. This way, each of the auxiliary conductors 31A, 31B, 31C, and 31D can be selectively connected to the GND surface of the L1 layer 11.

For example, suppose the multilayer substrate 100 in which the pads PD1 and the pads PD2 are not connected to each other, or in other words, none of the auxiliary conductors 31A to 31D is connected to the L1 layer 11, is manufactured. In this state, by connecting the pads PD1 of the auxiliary conductors 31A and 31B to the pads PD2 of the L1 layer 11 through the connecting lines 33, only the auxiliary conductors 31A and 31B, among the plurality of auxiliary conductors, will be connected to the GND surface of the L1 layer 11.

As described above, in the multilayer substrate 100 of this embodiment, a plurality of auxiliary conductors 31 are disposed and connected to the GND surface of the L1 layer 11. Therefore, due to the effect of the auxiliary conductors 31, the impedance characteristics of the antenna 22 of the wireless module 20 mounted on the multilayer substrate 100 will change.

Figure 5A:
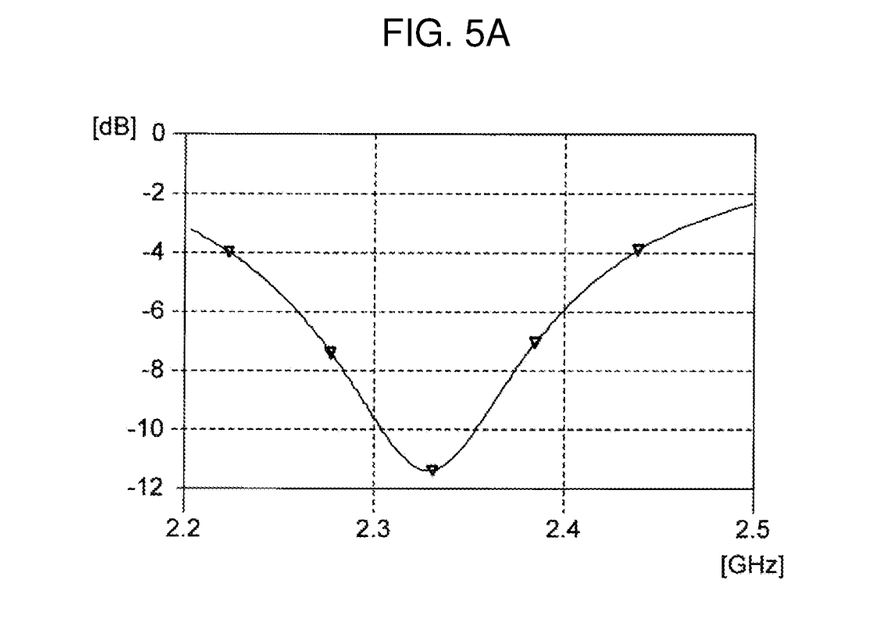
FIG. 5A is a diagram schematically illustrating the S11 characteristics in a case where auxiliary conductors are not connected.

FIG. 5A is a diagram illustrating the S11 characteristic, which is one of the impedance characteristics of the antenna 22 in a wireless module mounted substrate that does not have the conductor portion 30, unlike this embodiment.

The horizontal axis is the signal frequency (GHz), and the vertical axis is the insertion loss (dB) of the antenna. When the conductor portion 30 is not provided, and auxiliary conductors are not connected, the waveform of the insertion loss of the antenna 22 has the smallest value (or the peak) between 2.3 GHz and 2.4 GHz of the signal frequency.

A similar waveform is obtained in a case where, although the conductor portion 30 is provided, none of the auxiliary conductors 31 are connected to the L1 layer 11 (for example, in a case where all of the connecting conductors 32 are cut in the example of FIG. 4A).

Figure 5B:
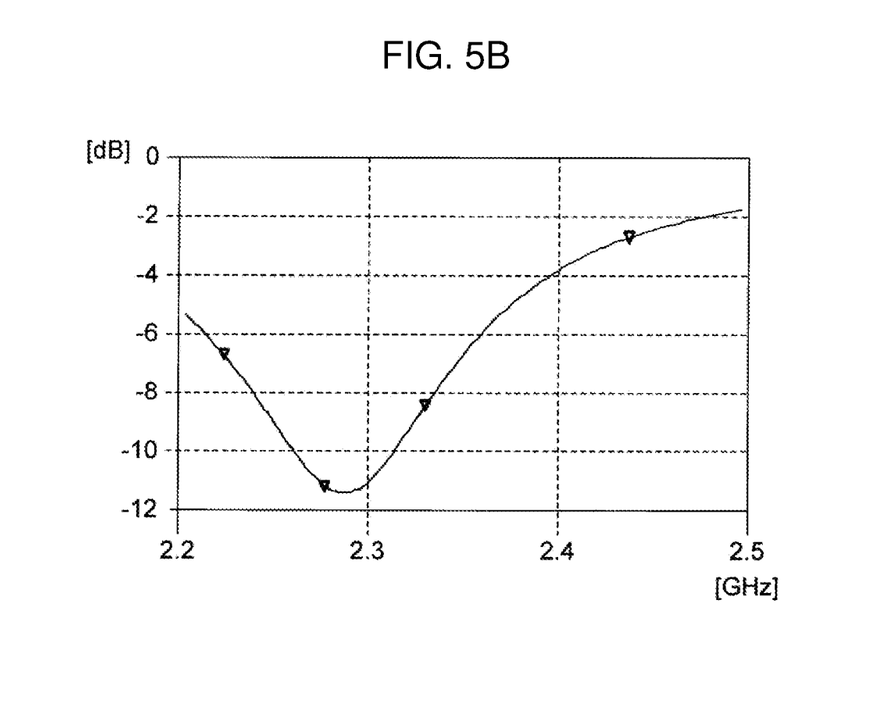
FIG. 5B is a diagram schematically illustrating the S11 characteristics in a case where auxiliary conductors are connected.

FIG. 5B is a diagram illustrating the S11 characteristic when the conductor portion 30 is provided and at least one auxiliary conductor 31 is connected to the L1 layer 11. In this case, the waveform of the insertion loss of the antenna 22 has the smallest value (or the peak) between 2.2 GHz and 2.3 GHz of the signal frequency.

That is, when the auxiliary conductor 31 is connected, the waveform (FIG. 5B) of the insertion loss of the antenna 22 is shifted toward the lower frequency side from the waveform (FIG. 5A) obtained when the auxiliary conductors 31 are not connected. This way, by having the auxiliary conductor 31 near the antenna 22 and connecting the auxiliary conductor 31 to the GND surface of the L1 layer 11, it is possible to change the impedance characteristics of the antenna 22.

In the multilayer substrate 100 of this embodiment, as described above, it is possible to selectively connect or disconnect each of the auxiliary conductors 31. Thus, the impedance characteristics of the antenna 22 can be adjusted such that the insertion loss is at a minimum (having the smallest value) in a desired frequency range, depending on the application of the wireless module 20 to be mounted.

Generally, when a wireless module is mounted on a multilayer substrate, the impedance characteristics of the antenna of the wireless module are subject to change due to the material or thickness of the substrate, the mounting location, and the like. In order to correct this change in impedance characteristics caused by the material of the substrate or the like, it is necessary to adjust the impedance characteristics, but any modification made to the wireless module itself might void the wireless authentication of the wireless module obtained before it is mounted on the multilayer substrate.

On the other hand, according to the multilayer substrate 100 of this embodiment, the impedance characteristics of the antenna 22 can be changed by connecting the auxiliary conductor 31 to the GND surface of the L1 layer 11. Thus, it is possible to adjust the impedance characteristics without modifying the wireless module itself after the wireless module is mounted on the substrate. That is, by adjusting the impedance characteristics to cancel the change caused by the substrate material or the like, desired impedance characteristics are ensured.

For example, as illustrated in FIG. 4A, suppose the auxiliary conductors 31A to 31D are all connected to the L1 layer 11 in the initial state, and the impedance characteristics are adjusted by cutting the connecting conductors 32. In this initial state, the peak of the insertion loss is located in a very low frequency range, and therefore, the connecting conductors 32 are cut such that the peak point is moved to a higher frequency range. On the other hand, as illustrated in FIG. 4B, suppose none of the auxiliary conductors 31A to 31D is connected to the L1 layer 11 in the initial state, and the impedance characteristics are adjusted by connecting the respective pads to each other via the connecting line 33. In this initial state, the peak of the insertion loss is located in a very high frequency range, and therefore, the connecting lines 33 are connected such that the peak point is moved to a lower frequency range.

As described above, in the multilayer substrate 100 of this embodiment, the conductor portion 30 having a plurality of auxiliary conductors 31 is provided near the area where the antenna 22 is to be located when the wireless module 20 is mounted on the substrate. The auxiliary conductors 31 are connected to the GND surface formed in the L1 layer 11, thereby changing the impedance characteristics of the antenna 22. Each of the auxiliary conductors 31 can be connected to or disconnected from the L1 layer 11 with ease. Therefore, according to the multilayer substrate 100 of this embodiment, it is possible to adjust the antenna characteristics when a wireless module is mounted, without modifying the wireless module itself.

The present invention is not limited to the embodiment described above. For example, in this embodiment, two conductor portions 30 were provided at the left side and the right side of the antenna 22 to face each other across the antenna 22. However, the conductor portion 30 may be provided at only one side of the antenna 22.

In this embodiment, the auxiliary conductor 31 had a rectangular shape, but the present invention is not limited to this, and the auxiliary conductor 31 may be formed in various shapes. Also, the number of the auxiliary conductors 31 is not limited to that described in the embodiment above.

In this embodiment, each of the auxiliary conductors 31 was directly connected to the GND surface of the L1 layer 11. However, some of the auxiliary conductors may be connected to the L1 layer 11 through another auxiliary conductor.

Figure 6A:
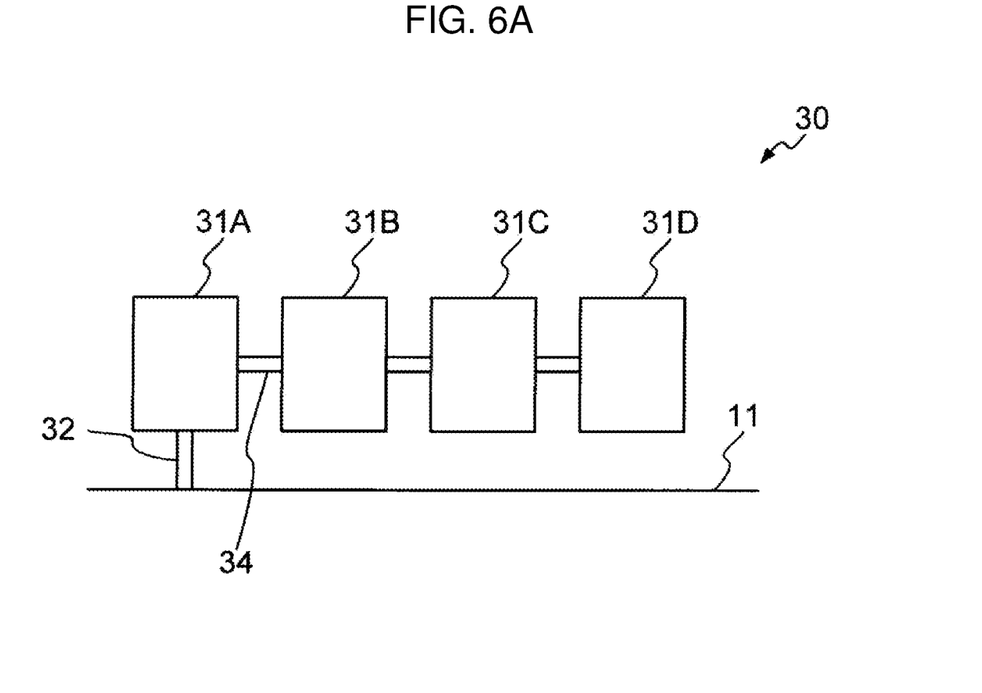
FIG. 6A is a diagram illustrating a modification example of the connecting part between the auxiliary conductors and the L1 layer.

FIG. 6A is a diagram illustrating this modification example of the connecting part between the auxiliary conductors and L1 layer 11. The auxiliary conductor 31A is connected to the L1 layer 11 via the connecting conductor 32. The auxiliary conductor 31B is connected to the auxiliary conductor 31A via a connecting line 34, and is connected to the L1 layer 11 via the auxiliary conductor 31A. The auxiliary conductor 31C is connected to the auxiliary conductor 31B, and is connected to the L1 layer 11 via the auxiliary conductors 31B and 31A. The auxiliary conductor 31D is connected to the auxiliary conductor 31C, and is connected to the L1 layer 11 via the auxiliary conductors 31C, 31B and 31A. That is, the auxiliary conductors 31A to 31D are connected in series to the L1 layer 11.

As described above, the auxiliary conductors 31 may include an auxiliary conductor directly connected to the L1 layer 11 and another auxiliary conductor indirectly connected to the L1 layer 11 via that auxiliary conductor. In this configuration as well, it is possible to adjust the impedance characteristics of the antenna 22 by cutting connecting lines between the respective auxiliary conductors (such as between 31B and 31C, or between 31B and 31D) and thereby changing the number of auxiliary conductors connected to the L1 layer 11.

Figure 6B:
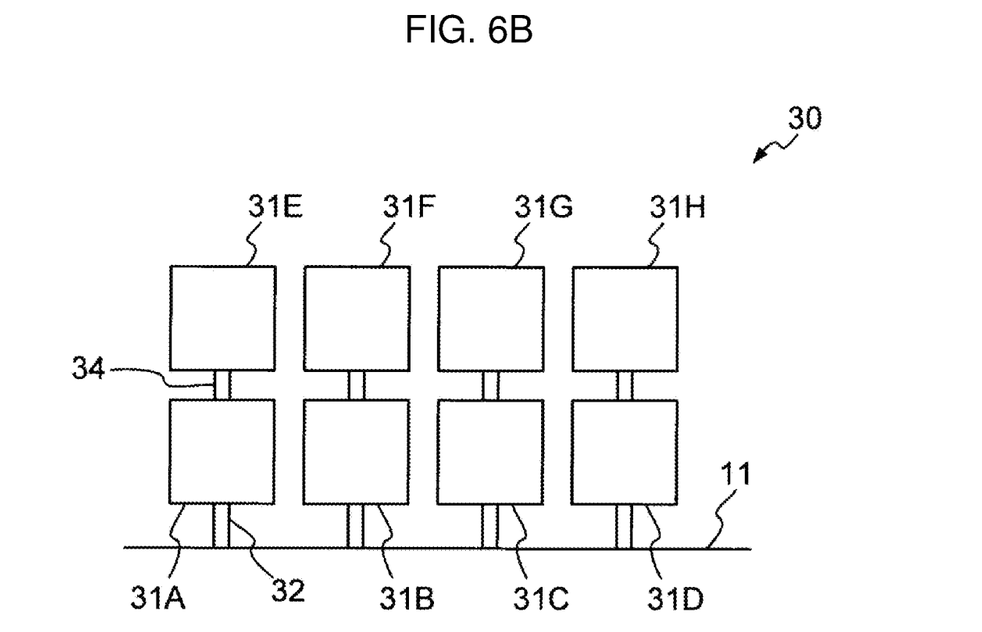
FIG. 6B is a diagram illustrating a modification example of the connecting part between the auxiliary conductors and the L1 layer.

FIG. 6B is a diagram illustrating another modification example of the connecting part between the auxiliary conductors and the L1 layer 11. The conductor portion 30 includes, in addition to the auxiliary conductors 31A to 31D directly connected to the L1 layer 11 by the connecting conductors 32, auxiliary conductors 31E, 31F, 31G, and 31H indirectly connected to the L1 layer 11 via the auxiliary conductors 31A to 31D. With this configuration, a greater number of auxiliary conductors can be provided, which makes it possible to fine-tune the impedance characteristics of the antenna 22.

In this embodiment, the auxiliary conductors 31 were formed on the PP layer 15. However, the auxiliary conductors 31 may be formed on another dielectric layer such as the PP layer 16 and the core layer 17.

Figure 7:
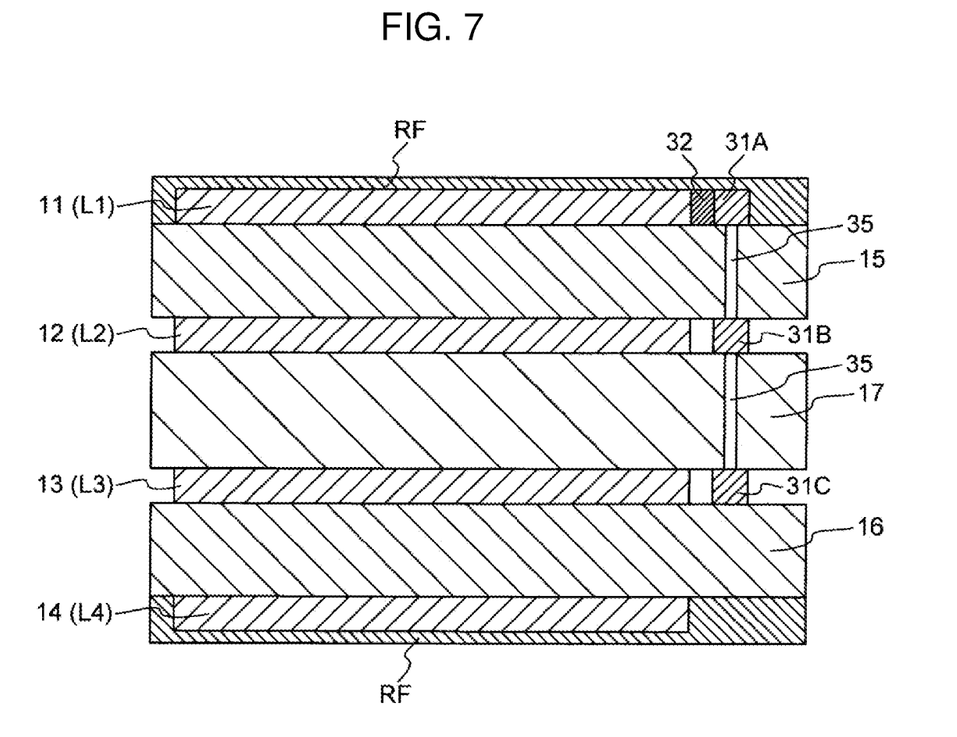
FIG. 7 is a cross-sectional view of a multilayer substrate in which a plurality of auxiliary conductors are disposed in different layers.

FIG. 7 is a diagram illustrating a cross section when some of the plurality of auxiliary conductors 31 are formed on the PP layer 15, and others are formed on the PP layer 16 and the core layer 17.

The auxiliary conductor 31A is formed on the PP layer 15, and connected to the GND surface of the L1 layer 11 via the connecting conductor 32. The auxiliary conductor 31B is formed on the core layer 17 between the PP layer 15 and the core layer 17, and connected to the auxiliary conductor 31A through the via 35. The auxiliary conductor 31C is formed on the PP layer 16 between the core layer 17 and the PP layer 16, and connected to the auxiliary conductor 31B through a via 35. That is, the auxiliary conductor 31B is indirectly connected to the GND surface of the L1 layer 11 via the auxiliary conductor 31A, and the auxiliary conductor 31C is indirectly connected to the GND surface via the auxiliary conductors 31B and 31A.

Figure 8A:
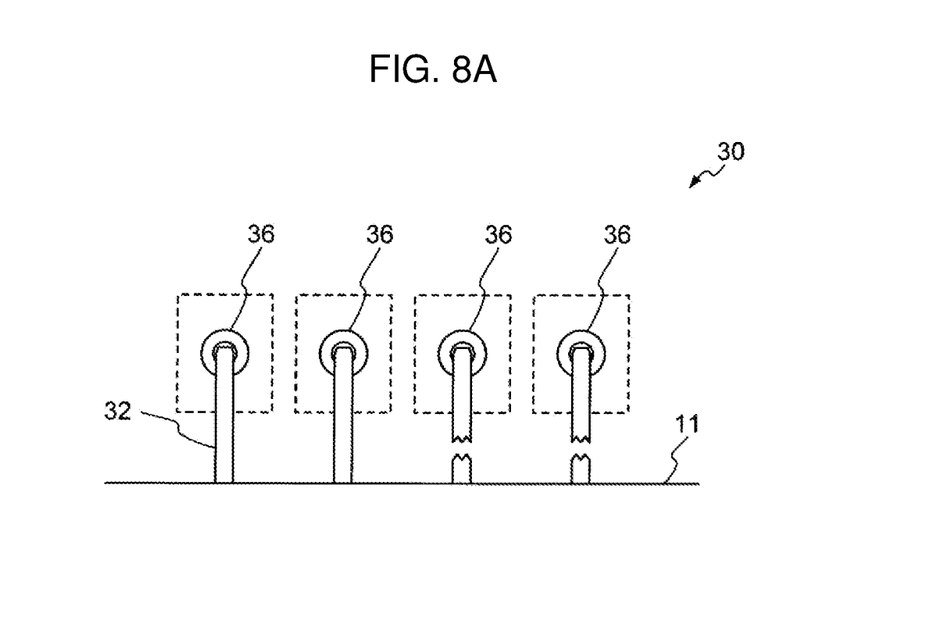
FIG. 8A is a top view illustrating the front surface of a multilayer substrate in which auxiliary conductors are placed in respective dielectric layers other than the first dielectric layer.

Unlike FIG. 7, all of the auxiliary conductors may be formed in other dielectric layers than the PP layer 15. FIG. 8A is a top view of the multilayer substrate 100 viewed from above the first region of the PP layer 15, and FIG. 8B is a cross-sectional view thereof.

As illustrated in FIG. 8A, auxiliary conductors are not formed in the first region of the PP layer 15, and via holes 36 for connecting the L1 layer 11 to auxiliary conductors provided in respective layers below the L1 layer 11 are formed in the first region of the PP layer 15.

Figure 8B:
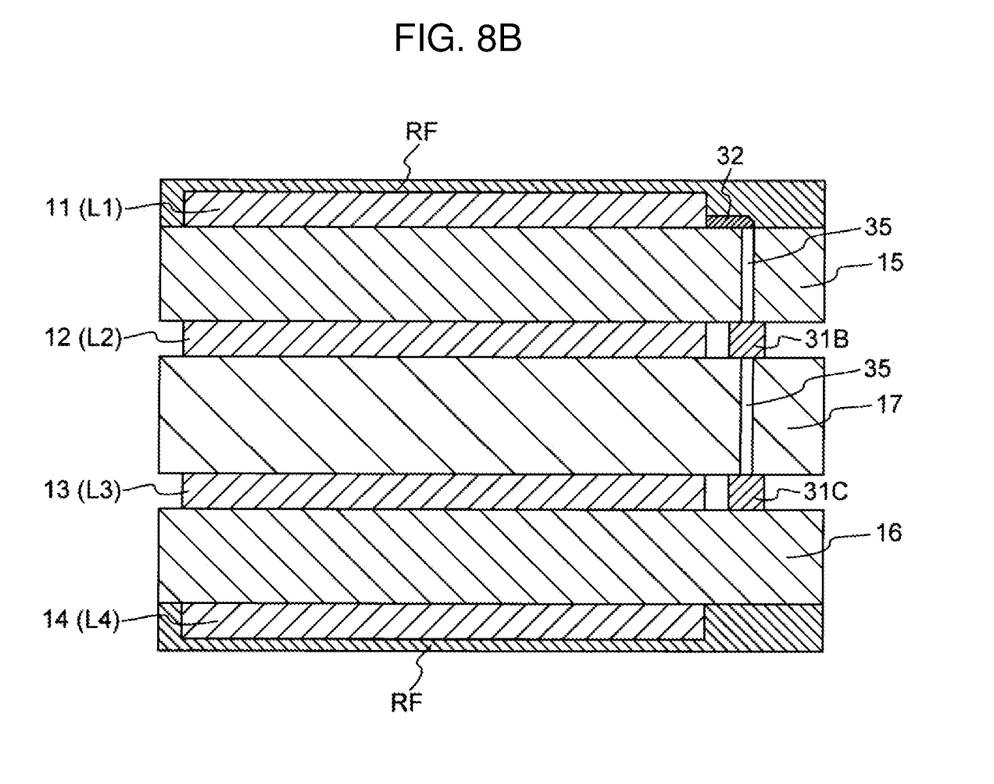
FIG. 8B is a cross-sectional view of a multilayer substrate in which auxiliary conductors are placed in respective dielectric layers other than the first dielectric layer.

Then, as illustrated in FIG. 8B, the auxiliary conductor 31B formed on the core layer 17 between the PP layer 15 and the core layer 17 is connected to the GND surface of the L1 layer 11 through the via 35 and the connecting conductor 32. The auxiliary conductor 31C formed on the PP layer 16 between the core layer 17 and the PP layer 16 is connected to the auxiliary conductor 31B through the via 35, and thus indirectly connected to the GND surface of the L1 layer 11.

With this configuration, even if the first region of the multilayer substrate 100 does not have enough space for auxiliary conductors, the auxiliary conductors can be placed in a plurality of layers, which makes it possible to secure a sufficient number of auxiliary conductors.

In the embodiment described above, the multilayer substrate 100 was constituted of a four-layer rigid substrate. However, the layer structure of the multilayer substrate 100 is not limited to this. The multilayer substrate 100 may be a flexible substrate.

What is claimed is:

1. A wireless module mounted substrate, comprising:
   a multilayer substrate comprising
      a first dielectric layer having a first region,
      a first conductive layer laminated on the first dielectric layer, excluding the first region, and
      a conductor portion having one or more auxiliary conductors disposed at a distance from the first conductive layer, and one or more connecting conductors that connect said one or more auxiliary conductors to the first conductive layer; and
   a wireless module having a main body including a communication circuit, and an antenna connected to the main body, the wireless module being mounted on the multilayer substrate such that the main body is located on the first conductive layer and the antenna is located on the first region of the first dielectric layer;
   wherein an edge of the first conductive layer opposite the conductor portion extends across a plurality of the auxiliary conductors.

2. The wireless module mounted substrate according to claim 1, wherein said connecting conductors are formed such that a diameter thereof in a direction that intersects with an extension direction is smaller than a diameter of said one or more auxiliary conductors, and the connecting conductors are cuttable.

3. The wireless module mounted substrate according to claim 1, wherein the conductor portion includes at least one auxiliary conductor directly connected to the first conductive layer through the connecting conductor, and another auxiliary conductor connected indirectly to the first conductive layer by being connected to said at least one auxiliary conductor.

4. The wireless module mounted substrate according to claim 1, wherein said one or more auxiliary conductors are formed in the first region of the first dielectric layer.

5. The wireless module mounted substrate according to claim 1, wherein the multilayer substrate has a layered structure in which a plurality of conductive layers including the first conductive layer and a plurality of dielectric layers including the first dielectric layer are alternately laminated, and
   wherein said one or more auxiliary conductors are formed on one or more of the plurality of dielectric layers.

6. The wireless module mounted substrate according to claim 5, wherein the conductor portion includes a first auxiliary conductor formed in the first region of the first dielectric layer and a second auxiliary conductor formed in a dielectric layer differing from the first dielectric layer among the plurality of dielectric layers, and
   wherein the first auxiliary conductor and the second auxiliary conductor are connected to each other through a via hole.

7. The wireless module mounted substrate according to claim 1, wherein said one or more auxiliary conductors are placed near the antenna.

8. The wireless module mounted substrate according to claim 1, wherein the first conductive layer includes a part mounting area located between a first group of the plurality of auxiliary conductors and a second group of the plurality of auxiliary conductors.

9. A wireless module mounted substrate, comprising:
   a multilayer substrate comprising
      a first dielectric layer having a first region,
      a first conductive layer laminated on the first dielectric layer, excluding the first region, and
      a conductor portion having a plurality of auxiliary conductors formed in the first region of the first dielectric layer at a distance from the first conductive layer; and
   a wireless module having a main body including a communication circuit, and an antenna connected to the main body, the wireless module being mounted on the multilayer substrate such that the main body is located on the first conductive layer and the antenna is located on the first region of the first dielectric layer;
   wherein said plurality of auxiliary conductors each have a first connecting pad,
   wherein the first conductive layer has a plurality of second connecting pads, and
   wherein the first connecting pads and the second connecting pads are configured to be connected to each other by connecting lines made of a conductor, and
   wherein an edge of the first conductive layer opposite the conductor portion extends across a plurality of the auxiliary conductors.

* * * * *